US005181131A

United States Patent [19]

Yamazaki et al.

[11] Patent Number: 5,181,131

[45] Date of Patent: * Jan. 19, 1993

[54] POWER CONSERVING DRIVER CIRCUIT FOR LIQUID CRYSTAL DISPLAYS

[75] Inventors: Shunpei Yamazaki, Tokyo; Akira Mase, Atsugi, both of Japan

[73] Assignee: Semiconductor Energy Laboratory Co., Ltd., Kanagawa, Japan

[*] Notice: The portion of the term of this patent subsequent to Apr. 21, 2009 has been disclaimed.

[21] Appl. No.: 812,034

[22] Filed: Dec. 23, 1991

Related U.S. Application Data

[60] Division of Ser. No. 726,165, Jul. 2, 1991, Pat. No. 5,107,354, which is a continuation of Ser. No. 431,454, Nov. 3, 1989, abandoned.

[30] Foreign Application Priority Data

Nov. 11, 1988 [JP] Japan ............................ 63-286466

[51] Int. Cl.[5] ............................ G02F 1/13

[52] U.S. Cl. ............................ 359/56; 359/84; 340/784

[58] Field of Search ............................ 359/55, 56, 84; 340/784, 713, 715, 752

[56] References Cited

U.S. PATENT DOCUMENTS

| | | | |
|---|---|---|---|
| 4,508,429 | 4/1985 | Nagae | 359/56 |
| 4,773,716 | 9/1988 | Nakanowatari | 359/56 |
| 4,909,607 | 3/1990 | Ross | 359/56 |
| 5,011,269 | 4/1991 | Wakita et al. | 359/56 |
| 5,107,354 | 4/1992 | Yamazaki | 359/56 |

*Primary Examiner*—William L. Sikes
*Assistant Examiner*—Huy K. Mai
*Attorney, Agent, or Firm*—Sixbey, Friedman, Leedom & Ferguson

[57] ABSTRACT

A driving circuit for a non-volatile liquid crystal display conserves battery power by applying a first set of electric fields to the display through an electrode array for a defined period of time, and then removing these fields for a second, longer period of time. The display picture produced by he first set of fields continues to be displayed during the second period when the fields are removed, due to the non-volatile characteristic of the liquid crystal layer. The circuit then applies a second set of electric fields to the display to change the picture produced.

4 Claims, 3 Drawing Sheets

POWER CONSERVING DRIVER CIRCUIT FOR LIQUID CRYSTAL DISPLAYS

This is a divisional application of Ser. No. 07/726,165, filed Jul. 2, 1991, now U.S. Pat. No. 5,107,354, which was a continuation application of Ser. No. 07/431,454 filed Nov. 3, 1989, abandoned.

BACKGROUND OF THE INVENTION

The present invention relates to a method of driving liquid crystal displays, and more particularly relates to a display device.

There has been developed a compact liquid crystal display suitable for use in portable lap-top personal computers or word-processors. In the case of A4 size displays including supernematic liquid crystal materials (640×400 dots), the displaying operation consumes 1 to 2 W. Conventional secondary cells cannot continuously supply such a large amount of energy and therefore it is necessary to use a commercial line supply of AC energy. Low energy consumption is preferred in this application in order to avoid running short of energy during use and resorting to a line supply.

SUMMARY OF THE INVENTION

It is therefore an object of the present invention to provide a method of driving liquid crystal displays with a decreased energy consumption.

In order to accomplish the above and other objects and advantages, driving signals are supplied to a liquid crystal display not in a continuous manner but in an intermittent manner. In one embodiment, the liquid crystal display is a ferroelectric liquid crystal non-volatile display. There are two stable states of the liquid crystal molecule condition in accordance with which visual images can be constructed. During the displaying operation, rest periods in which no signal is supplied to the liquid crystal display alternate with drive periods in which driving signals are supplied in order to apply electric fields to the ferroelectric liquid crystal in the device. The duty ratio is determined in accordance with the action of the ferroelectric liquid crystal.

If the non-volatile property of the liquid crystal display is particularly enhanced, i.e. the liquid crystal display can maintain an image, with no need of furnishing energy, once constructed. However, the non-volatile property tends to cause the image displayed to linger on after a new input signal is applied in order to construct a next image to replace it. For this reason, the liquid crystal material must be blended in order that the constructed image decays over a period of time when no signal is supplied, and therefore, even if an image is displayed and unchanged, the image must be refreshed by intermittently applying driving signals within the period of decay.

BRIEF DESCRIPTION OF THE DRAWING

This invention can be better understood from the following detailed description when read in conjunction with the drawing in which.

DETAILED DESCRIPTION OF THE PREFERRED EMBODIMENTS

Figure 1:
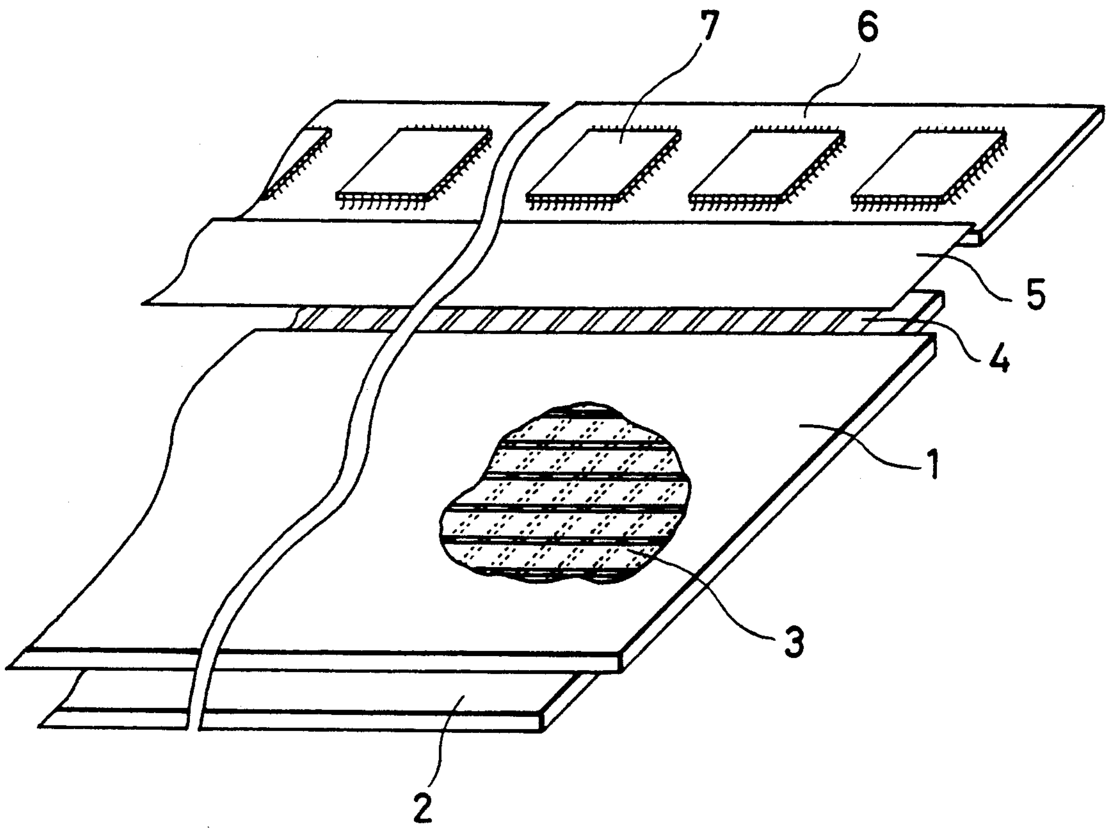
FIG. 1 is a perspective view showing a liquid crystal display which is driven in accordance with an embodiment of the present invention.

Referring now to FIG. 1, a perspective view showing a bistable liquid crystal display is illustrated. The display comprises a pair of glass substrates 1 and 2 between which a ferroelectric liquid crystal material is disposed. The substrate 1 has a thickness of 0.5 mm and provides the front surface of the display. The substrate 2 is made of a soda-lime glass pane of a thickness of 1.1 mm and constitutes the supporting structure of the display. The inside surface of the substrates 1 and 2 are formed with parallel electrode strips 3 constituting columns and rows in a matrix arrangement respectively.

The electrode strips are formed by coating ITO films of 1300 Å on the substrate followed by excimer laser patterning. The distance between each adjacent strip is 0.4 mm in order that two orthogonal sets of 720 strips form 720×720 dots in matrix. Peripheral circuits are formed simultaneously as well as contact patterns for making connections with IC chips 4. The inner surface of the substrate 1 is covered with a polyimide film of 50–1000 Å, preferably 200 Å thickness over the electrode strips. The polyimide film is thermally annealed for 2 hours at 280° C. in order to be converted to an imide film and given rubbing treatment using a cloth which is characterized by a long soft pile. The inside surface of the other substrate 2 is coated with a $SiO_2$ film of 50–1000 Å, preferably 200 Å thickness over the electrode and with an adhesive film pattern surrounding the pattern. After dusting the inside surface of the substrate 2 with spacers of $SiO_2$ particles of 1–5 micrometers, preferably 2 micrometers diameter by a spraying method, the two substrates are joined under a pressure of 2 Kg/cm$^2$ at 180° C. for two hours. Then, a ferroelectric liquid crystal material such as ZLI-3775 manufactured by Merk Co. is disposed between the substrate by vacuum injection. Finally, IC chips for signal processing are mounted on and connected with the peripheral circuit. The periphery is sealed off by an epoxy resin. The electrode strips are connected with an external control circuit 6 comprising IC chips 7 through a flexible connection 5. The liquid crystal display is operated with a pair of polarizing plates arranged in perpendicular directions and sandwiching the display.

Figure 2:
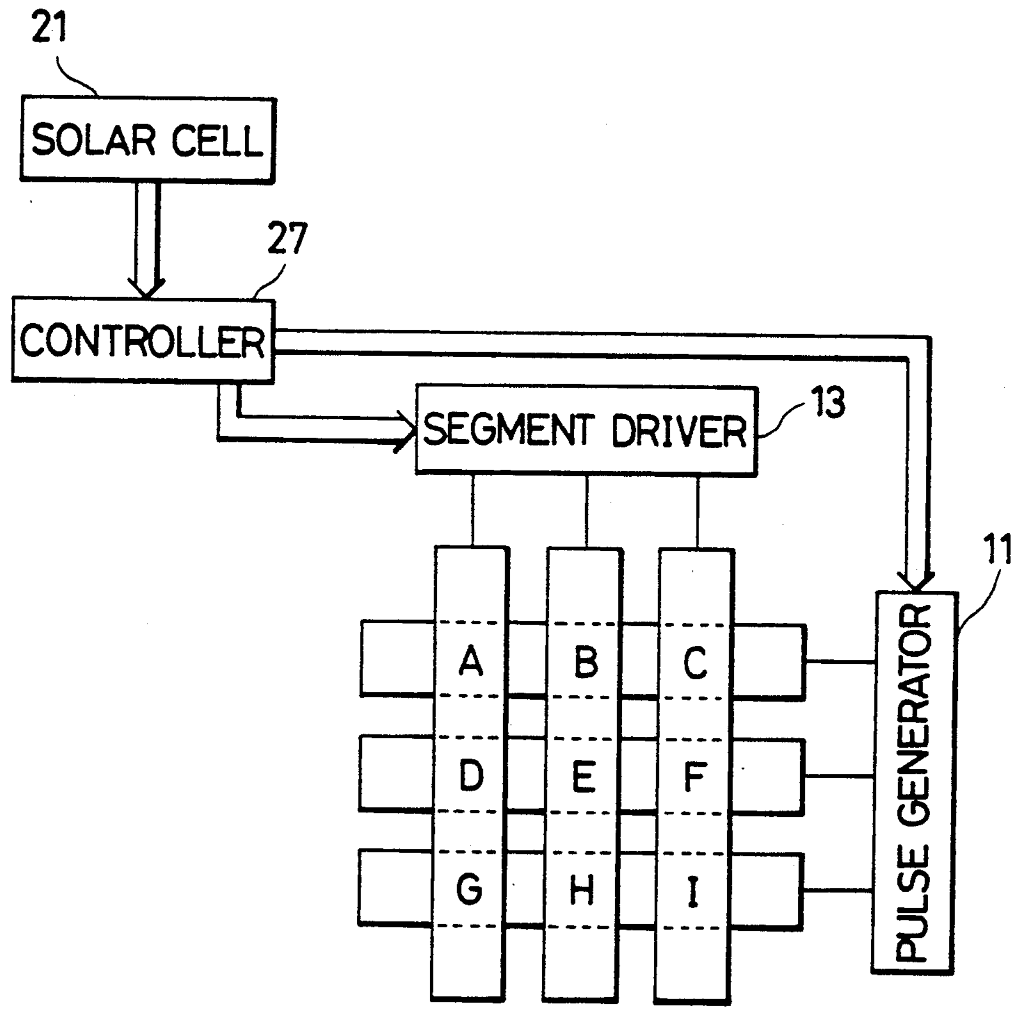
FIG. 2 is a schematic diagram showing a driving circuit of the liquid crystal display illustrated in FIG. 1 in accordance with the present invention.

Now, a driving method for the display in accordance with the present invention will be explained. FIG. 2 is a schematic diagram showing the liquid crystal driving system. In the figure, only a 3×3 matrix display is illustrated for the purpose of clarity. In actual configurations, more large scale matrices are employed. The row strips are connected to a pulse generator 11 which supplies address pulsed signals. In synchronization with the address signals, the column strips are supplied with data signals from a segment driver 13 in order to display a visual image on the matrix. Each signal is generated by use of a shift register. The segment driver and the pulse generator are driven by a controller 19 which is powered by a solar cell 21.

Figure 3A:
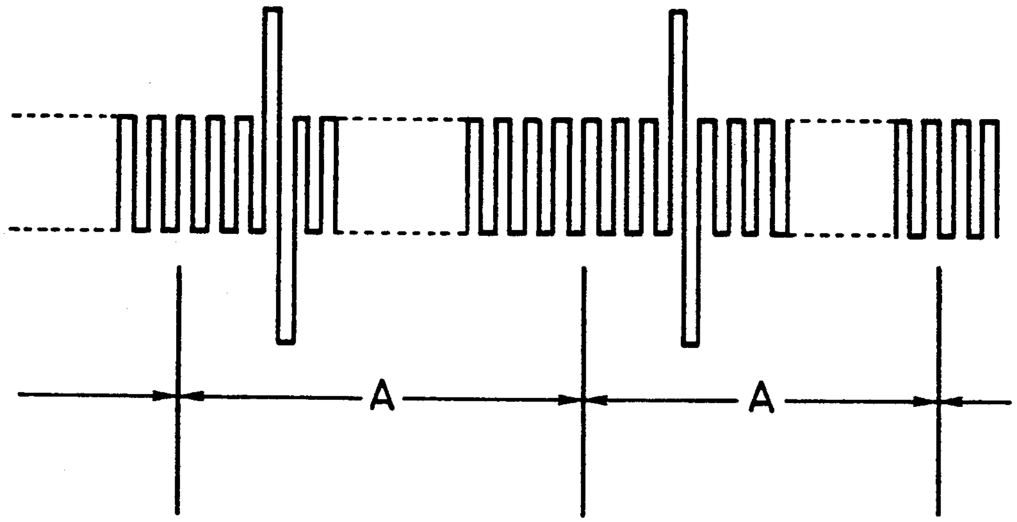
FIG. 3(A) PRIOR ART
FIG. 3(A) is a graphical diagram showing a driving signal for displaying an image on the liquid crystal display in accordance with the prior art.
Figure 3B:
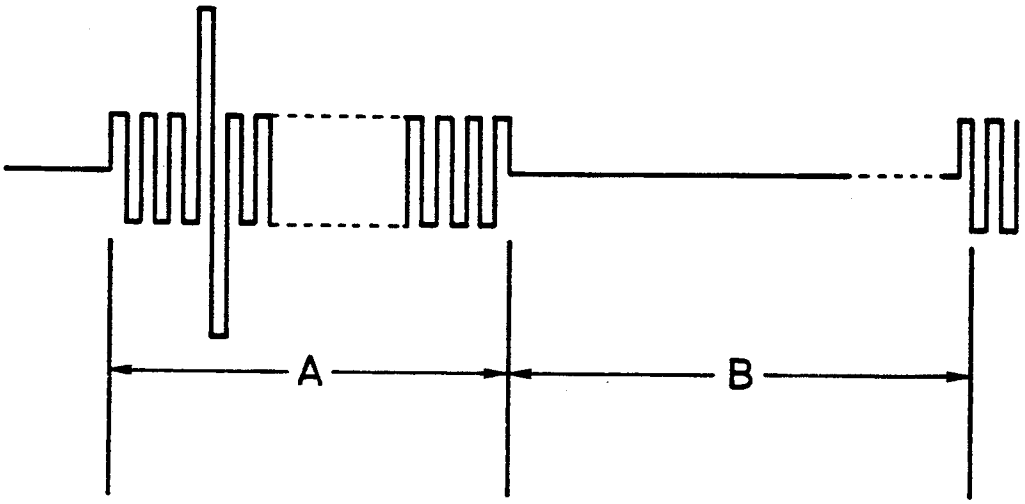
FIG. 3(B) is a graphical diagram showing a driving signal for displaying an image on the liquid crystal display in accordance with the present invention.

FIG. 3(B) illustrates either of an address signal or a data signal representatively. The shape of the signal is only schematic. Reference A designates a driving period and reference B designates a rest period. These periods occur alternately. For example, the length of the driving period may be one second while that of the pause period is 59 seconds. Of course, these lengths can be selected arbitrarily in accordance with the case.

When experiments were conducted to compare driving methods in accordance with the present invention and the prior art, the power consumption in the case of the driving signal as illustrated in FIG. 3(B) was measured to be 40 mW while that with the continuous driving signal as illustrated in FIG. 3(A) was 2.4 W.

While several embodiments have been specifically described by way of examples, it is to be appreciated that the present invention is not limited to the particular examples described and that modifications and variations can be made without departing from the scope of the invention as defined by the appended claims.

What is claimed is:

1. Apparatus for conserving the battery power supply of a liquid crystal display including a pair of substrates, a liquid crystal layer having a non-volatile property, and an electrode arrangement corresponding to an m×n matrix of picture elements where all said picture elements are elements of a display picture to be displayed by said display, said electrode arrangement being adapted to apply electric fields to aid liquid crystal layer for displaying said picture, said apparatus comprising:

means for applying first electric fields for a first period of time to said liquid crystal layer to display a first display picture;

means for removing said first electric fields for a second period of time greater than said first period of time whereby the first display picture continues to be displayed due to the non-volatile property of the liquid crystal layer; and means for applying second electric fields to said liquid crystal display to change the picture displayed by the display from said first display picture to a second display picture.

2. Apparatus as in claim 1 where the battery power supply comprises a solar cell.

3. The apparatus of claim 1 wherein said liquid crystal layer has a bistability characteristic.

4. The apparatus of claim 3 wherein said liquid crystal layer is a ferroelectric liquid crystal layer.

* * * * *